United States Patent [19]
Schwartz

[11] 3,833,125
[45] *Sept. 3, 1974

[54] UNIVERSAL COFFEE FILTER

[75] Inventor: Harlan A. Schwartz, Manitowoc, Wis.

[73] Assignee: Schwartz Manufacturing Company

[ * ] Notice: The portion of the term of this patent subsequent to Mar. 6, 1990, has been disclaimed.

[22] Filed: Mar. 6, 1973

[21] Appl. No.: 338,607

Related U.S. Application Data

[63] Continuation-in-part of Ser. No. 89,616, Nov. 16, 1970, Pat. No. 3,719,282.

[52] U.S. Cl. .............................................. 210/477
[51] Int. Cl. ........................................... B01d 35/28
[58] Field of Search ...... 210/477, 482, 483; 99/295, 99/312, 77.1; D7/47, 68

[56] References Cited
UNITED STATES PATENTS

| | | | |
|---|---|---|---|
| 2,889,049 | 6/1959 | Hauser | 210/477 X |
| 3,250,398 | 5/1966 | Adiletta | 210/477 UX |
| 3,343,682 | 9/1967 | Harvith | 210/477 |
| 3,360,132 | 12/1967 | Harvith | 210/477 |
| 3,386,586 | 6/1968 | Ackerman | 210/477 |
| 3,437,540 | 4/1969 | Welin-Berger | 210/477 |
| 3,444,791 | 5/1969 | Honsel | 210/477 |
| 3,719,282 | 3/1973 | Schwartz | 210/477 |

Primary Examiner—Samih N. Zaharna
Assistant Examiner—F. F. Calvetti
Attorney, Agent, or Firm—Dressler, Goldsmith, Clement & Gordon, Ltd.

[57] ABSTRACT

A coffee filter element having a plurality of short, non-intersecting slits adjacent its center, said slits converging toward a tab portion at the center of the filter. The filter can be used in a dripolator or percolator coffee maker.

6 Claims, 2 Drawing Figures

PATENTED SEP 3 1974          3,833,125

3,833,125

UNIVERSAL COFFEE FILTER

REFERENCES TO RELATED APPLICATION

This application is a continuation-in-part of application Ser. No. 89,616 filed Nov. 16, 1970, now U.S. Pat. 3,719,282.

BACKGROUND OF THE INVENTION

This invention relates to a coffee filter sheet which is universal to a range of sizes of coffee baskets, and is adapted for use with coffee makers having a basket stem, as in a percolator, and with coffee makers having no basket stem, as in a dripolator.

There are a variety of available coffee filter sheets which are presently used by placing them in coffee baskets at their bases. Because coffee baskets define small perforations at their bases, through which coffee brew passes into the coffeepot, coffee grounds and sediment frequently also pass through those perforations and into the coffeepot below. Accordingly, it has been found increasingly desirable to use filter sheets such as filter papers, at the base of the baskets, upon which the ground coffee is placed, for perking or dripping.

Coffee makers, and in particular domestic coffee makers, utilize baskets of different base diameters and shapes depending upon the manufacturer and model. Such baskets may range from about 2½ inches in diameter to as much as more than 5 inches in diameter, although most fall within the range of 2½ inches to 4½ inches. That being so, it has been generally necessary to manufacture and sell a number of circular coffee filter sheets ranging in quarter inch or half inch increments in diameter from about 2½ inches to as much as 5 inches. Such baskets may also be somewhat oval.

Various proposals for making coffee filter sheets or elements universal to a range of coffee basket types or sizes have been made. In Harvith U.S. Pat. No. 3,343,682, filter elements of differing diameters may be made from a single large diameter filter sheet which has a series of circular tear strips concentric with its center. That sheet requires the careful separation of annular portions of the sheet by a user, which is both difficult and time consuming. Other patents, such as that to Cirrincione, U.S. Reissue Pat. No. 26,716, have proposed the formation of a pouch which contains a number of radial slits. Still other patents have proposed other shaped slits for beverage filters such as the C-shaped slit of U.S. Pat. No. 3,386,586 and the H-shaped slit of U.S. Pat. No. 3,250,398. The slit arrangements suggested in these patents do not enjoy the benefits of manufacture and use of the slit arrangement of the present invention.

In accordance with this invention, an effective filter sheet universal to a range of different coffee basket dimensions is provided. A single filter sheet, such as a paper-like, non-woven fabric of a given diameter, is configured effectively to seal the base of coffee baskets of different diameters. This is accomplished by providing a series of spaced narrow slits extending from the outer periphery of the filter paper inwardly. When a filter paper is slitted in that fashion, and is pressed downwardly into the base of a coffee basket having a diameter smaller than that of the filter paper itself, the portions of the filter paper adjacent the slits will overlap at the slitted edges to form a peripheral lip lying against the vertical wall of the filter basket. The entire base of the filter basket will be covered by a central portion of the filter paper itself. Alternatively, it is possible to use the present invention in a coffee filter designed specifically for percolator use.

To make such a universal filter sheet usable in either dripolators or percolators, preferably the center of the filter sheet is provided with a plurality of slits, defining a series of pie-shaped segments or flaps which will snugly seal against the upwardly extending basket stem when a stem is present. When a dripolator is used (i.e., no basket stem is present), the slits are so narrow as to substantially prevent the passage of coffee grounds or sediment therethrough, expecially because the central portion of the basket is usually imperforate.

Filter sheets made in accordance with this invention have been found to satisfactorily filter coffee in baskets ranging from diameters of as little as 2½ inches to as much as 4½ to 5 inches or more.

Further advantages, features and objects of this invention will become apparent from the following description and drawings of which:

DETAILED DESCRIPTION

Figure 1:
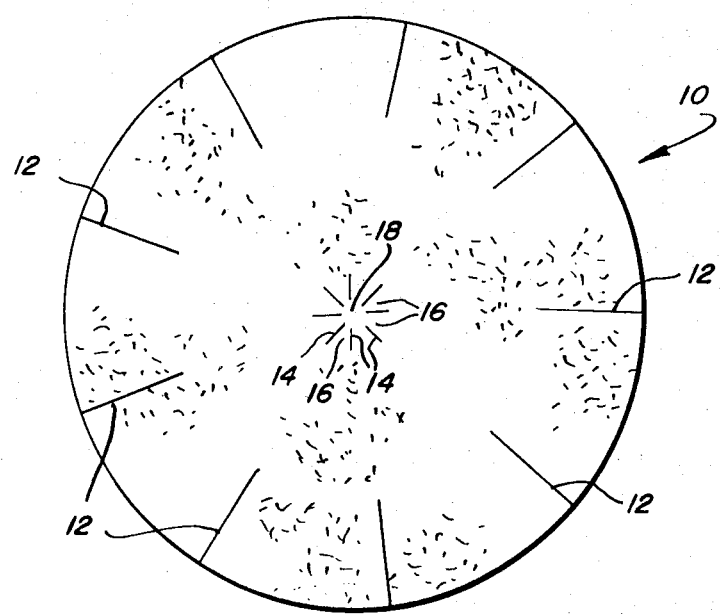
FIG. 1 is a plan view of an embodiment of a filter sheet of this invention which is universal to both percolator and dripolator coffee makers as well as various size coffee baskets.

Referring first to FIG. 1, filter sheet 10 is configured to be universal to a series of coffee baskets having the same base configuration but having different diameters. The filter sheet 10 may be of any suitable material, but preferably is of a thin paper-like, non-woven fabric presently known to the art and presently used for coffee filtering.

Filter sheet 10 defines a plurality of narrow slits 12, the edges of which slits contact and abut each other. The slits are made by a sharp edge cutting tool, as by a cutting blade. Optimally, the slits are nine in number, are radial and are equidistantly spaced (at forty degree intervals) about the periphery of the filter sheet 10.

In a presently preferred embodiment, the flat paper-like filter sheet 10 is 4½ inches in diameter. Each of the slits 12 projects inwardly from the periphery of the filter sheet a radial distance equal to at least ½ inch and preferably 1 inch. As such, filter sheet 10 will serve to cover the bases of coffee baskets having diameters ranging from 2½ inches to 4½ inches. It has been determined that with coffee filter sheets made of filter paper of this size that nine slits 12 spaced at 40° intervals about the periphery of sheet 10 will conform most effectively and readily to baskets within the range of diameters. However greater or lesser numbers of slits may be used to obtain similar results, although the optimum appears to be nine.

Figure 2:
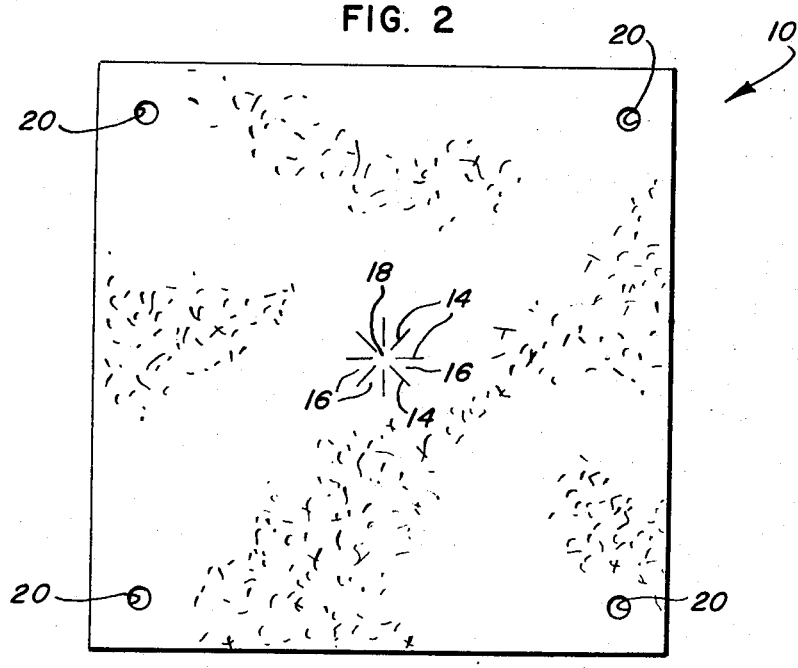
FIG. 2 is a plan view of a filter sheet of this invention adapted for use in percolator coffee baskets.

Filter sheet 10 also defines a plurality of slits, such as radial slits 14, at its center. As illustrated in FIGS. 1 and 2, the flaps or pie-shaped segments 16 defined between pairs of adjacent slits 14 will be upstruck by a coffee basket stem when the coffee filter is used in conjunction with a percolator basket. The pie-shaped segments will substantially seal about the coffee basket stem to substantially prevent the passage of grounds and sediment below the filter paper and through the bottom of the coffee basket itself.

It will be noted that each of the radial slits 14 terminates adjacent a central tab 18. This tab serves to hold all of the pie-shaped segments 16 closed when the filter is used in a dripolator.

In the absence of central tab 18 radial slits may separate during the filters placement in the dripolator basket or during other handling creating voids which allow passage of coffee grounds.

Tab 18 separates easily when the filter is pushed onto a percolator stem, thereby to facilitate the clean breaking of the slits and the consequent conformity of the segments 16 to the stem. Furthermore, the provision of the central tab facilitates the formation of the slits in the cutting. When so many cutting edges must accurately meet at a point, it is very difficult accurately and economically to make such cutting edges and to maintain the cutting edges. Hence, it frequently occurs that the paper is crushed rather than slitted at the center, resulting in improperly cut slits, and inoperative slits. By providing the central tab, substantially improved and consistent slitting is obtained, hence conformity to the rounded shape of a percolator basket stem results.

The manner in which a filter sheet 10 is adapted to be used with filter baskets is readily understood. In a coffee basket having the same base diameter as filter sheet 10, the sheet is simply laid into the bottom of the basket 30 to cover the coffee basket base.

Because there is substantially no space between the edges defining the slits 12, no coffee grounds will pass therebetween. Thus, the coffee filter sheet 10 will provide a barrier across the entire base of the coffee basket to prevent the passage of coffee grounds and sediment downwardly through the perforated base of the coffee basket. However, because the paper filter sheet is porous, it will not interfere with the passage of the water and coffee brew therethrough.

In a percolator coffee basket having a centrally located stem, pie-shaped segments 16 will be upstruck by the stem. When pie-shaped segments 16 become wet during the coffee brewing process, pie-shaped segments 16 substantially seal about the circumference of the coffee basket stem. Therefore the voids or openings near the surface of the stem which allow seepage of coffee grounds in brewing coffee is prevented by the use of the present invention.

The coffee filter of the present invention may also be used in coffee baskets having smaller base diameters than the filter 10.

In such cases, slits 12 fold upwardly against the side of a coffee basket and slightly overlap to form a lipped filter cup at the base of a coffee basket.

FIG. 2 is a plan view of a filter sheet of this invention adapted for use in percolater coffee basekts.

The filter has a central tab 18, flap or pie-shaped segments 16 defined between pairs of adjacent slits 14 which will be upstruck by the coffee basket stem of a percolater basket as heretofore described in conjunction with FIG. 1.

However the filter is provided with openings 20 which are adapted to fit over the basket stem. In this manner a pouch containing the coffee grounds is formed. Slits may be substituted for holes 20, if desired.

The above description has been given for clearness of understanding. No unnecessary limitations should be understood therefrom since modifications will, of course, be apparent to those skilled in the art.

I claim:

1. A coffee filter for use in dripolator and percolator coffee makers comprising a thin flat porous filter sheet having a plurality of short non-intersecting slits converging toward the center of said filter, said slits having edges which contact and abut each other, the inner ends of said slits defining a small tab, said converging slits defining pie-shaped segments of said filter sheet which are contiguous with said tab at the inner ends thereof, said tab providing positive closure means to prevent seepage of coffee grounds through said slits when the filter is used in a coffee basket having no stem, and said slits being adapted to break away from said small tab to sealingly surround a coffee basket stem when pressed to the bottom of a coffee basket having a basket stem.

2. The filter of claim 1 wherein said filter sheet is circular in plan view.

3. The filter of claim 1 wherein said slits are radial slits and said filter sheet is a paper-like non-woven fabric.

4. The filter of claim 1 wherein said slits are 8 in number.

5. The coffee filter of claim 1 wherein said slits define flaps, said flaps being adapted to sealingly receive a coffee basket and stem projecting upwardly from the base of a coffee basket.

6. A filter for circular coffee baskets, said filter comprising a circular thin flat filter sheet defining a plurality of short, non-intersecting slits converging toward the center of said filter, said slits having edges which contact and abut each other, the inner ends of said slits defining a small tab, said converging slits defining pie-shaped segments of said filter sheet which are contiguous with said tab at the inner ends thereof, said tab providing positive closure means to prevent seepage of coffee grounds through said slits when the filter is used in a coffee basket having no stem, and said slits being adapted to break away from said small tab to sealingly surround a coffee basket stem when pressed to the bottom of a coffee basket having a basket stem.

* * * * *